US012644731B2

(12) United States Patent
Salvadé et al.

(10) Patent No.: US 12,644,731 B2
(45) Date of Patent: Jun. 2, 2026

(54) OPTO-ELECTRONIC ENCODER WITH A BALL LENS

(71) Applicant: HEXAGON INNOVATION HUB GMBH, Heerbrugg (CH)

(72) Inventors: Yves Salvadé, St-Imier (CH); Markus Sprecher, Grabserberg (CH); Peter Kipfer, Widnau (CH); Marcel Rohner, Grub (CH); Tim Mayer, Widnau (CH); Beat Aebischer, Heerbrugg (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 182 days.

(21) Appl. No.: 17/974,058

(22) Filed: Oct. 26, 2022

(65) Prior Publication Data

US 2023/0125524 A1 Apr. 27, 2023

(30) Foreign Application Priority Data

Oct. 27, 2021 (EP) .................................... 21205107

(51) Int. Cl.
*G01D 5/30* (2006.01)
*B25J 19/02* (2006.01)
(Continued)

(52) U.S. Cl.
CPC .............. *G01D 5/30* (2013.01); *B25J 19/021* (2013.01); *G01B 11/26* (2013.01); *G01D 18/001* (2021.05)

(58) Field of Classification Search
CPC ....... G01B 11/002; G01B 11/26; G01B 11/27; G01B 11/272; G01B 11/24;
(Continued)

(56) References Cited

U.S. PATENT DOCUMENTS 5,847,820 A 12/1998 Hamar
5,880,839 A 3/1999 Ishizuka
(Continued)

FOREIGN PATENT DOCUMENTS

CN 110785624 A 2/2020
DE 102017131102 A1 7/2018
(Continued)

OTHER PUBLICATIONS

Richard J. et al., "Radar cross section measurements of frequency selective terahertz retroreflectors," Proceedings of SPIE, IEEE, vol. 9102, pp. 91020R-91020R (May 21, 2014).
European Search Report dated Apr. 21, 2022 as received in Application No. 21205107.2.

*Primary Examiner* — Christina A Riddle
(74) *Attorney, Agent, or Firm* — Maschoff Brennan

(57) ABSTRACT

An image based opto-electronic encoder for a joint, the encoder having a reading head for the first part of the joint and an optical system, comprising a ball lens for the second part of the joint. The ball lens has a front surface transparent for measuring light and an at least partially reflective, structured back surface. The ball lens has—with respect to the measuring light—a refractive index of at least approximately two or an equal radially varying refractive index, such that a bundle of measuring light rays reflected inside the ball lens from a point of the back surface of the ball lens forms at least approximately a parallel bundle after getting refracted at the front surface of the ball lens. The reading head and the ball lens are rotatable relative to each other in at least two degrees of freedom.

20 Claims, 4 Drawing Sheets

(51) Int. Cl.
*G01B 11/26* (2006.01)
*G01D 18/00* (2006.01)

(58) Field of Classification Search
CPC .. G01B 11/2408; G01B 11/005; G01B 5/004; G01B 5/008; G01B 5/24; G01B 5/25; G01B 5/252; G01B 11/03; G01B 11/14; G01B 21/045; G01B 11/00; G01B 11/02; G01B 5/20; G01B 11/25; G01B 21/047; G01S 17/66; G01S 3/783; G01S 3/786; G01S 5/163; G01C 15/002; G01C 2009/066; G01C 9/06; G01C 2009/107; G01D 5/344; G01D 5/30; G01D 18/001; G01M 11/08; G01P 13/025; G03B 21/2046; G03B 21/2073; B25J 19/021; G02B 5/126–134
USPC ......................... 356/138, 140–149, 614–624
See application file for complete search history.

(56) References Cited

U.S. PATENT DOCUMENTS

| | | | | |
|---|---|---|---|---|
| 6,618,132 | B1 * | 9/2003 | Vann | G01S 17/46 235/494 |
| 8,314,939 | B2 | 11/2012 | Kato | |
| 10,082,521 | B2 | 9/2018 | Atlas et al. | |
| 2011/0222170 | A1 * | 9/2011 | Tanimura | G02B 5/134 359/727 |
| 2016/0153774 | A1 | 6/2016 | Kodaira | |
| 2019/0195626 | A1 * | 6/2019 | Iseli | G06F 18/251 |
| 2020/0408520 | A1 * | 12/2020 | Jensen | G01C 15/002 |

FOREIGN PATENT DOCUMENTS

| | | | |
|---|---|---|---|
| EP | 3026393 | A1 | 6/2016 |
| EP | 3757514 | A1 | 12/2020 |
| JP | H08210814 | A | 8/1996 |
| WO | 2009/113484 | A1 | 9/2009 |

* cited by examiner

Fig. 6a
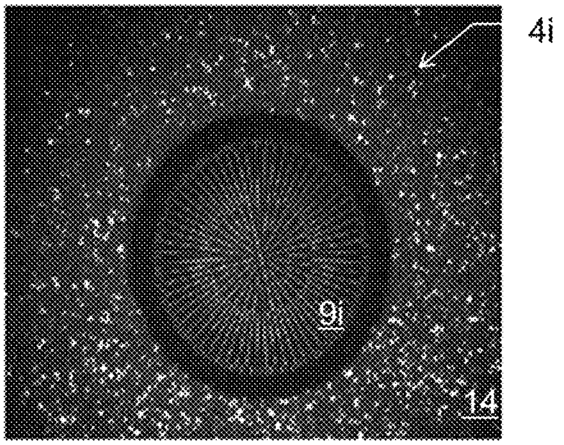
Fig. 6b
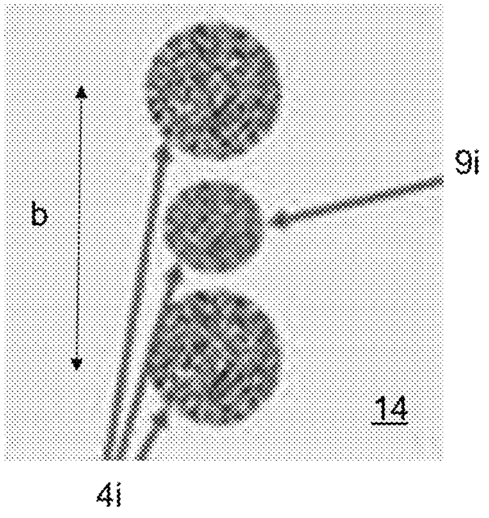
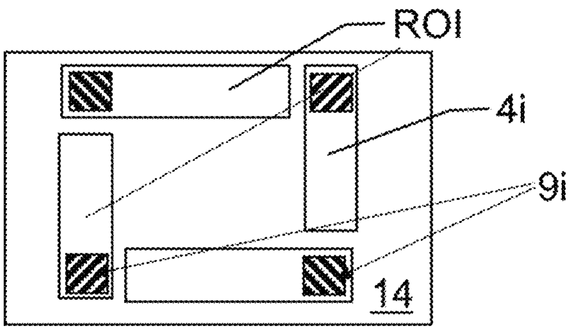
Fig. 7
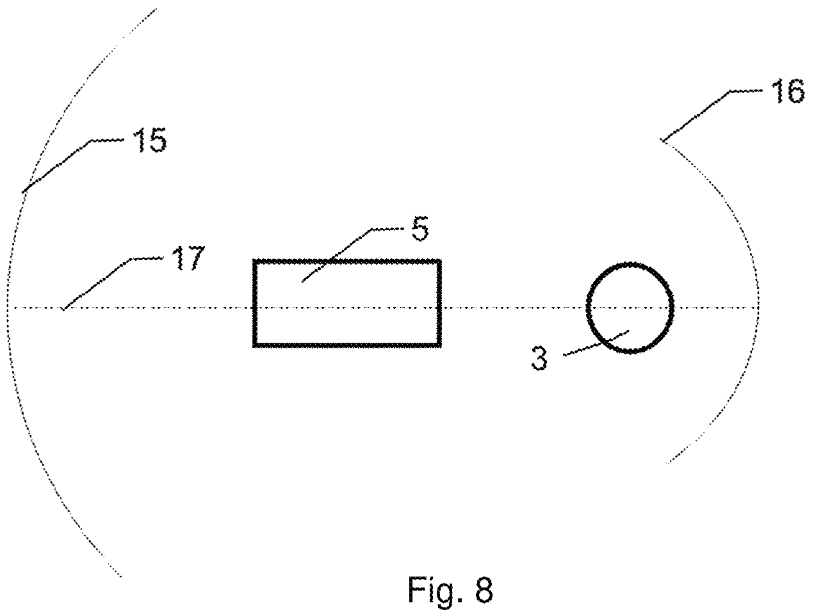
Fig. 8

OPTO-ELECTRONIC ENCODER WITH A BALL LENS

BACKGROUND

This disclosure relates to an opto-electronic encoder and a method for determination of the rotational position of a joint.

A series of joints, equipped with encoders, and links connecting an end effector to a base are at the heart of many of the systems used today in portable metrology. The joints in use today have one single degree-of-freedom (DOF), i.e. they ideally constrain the motion between two links to either a translation or a rotation and are equipped with encoders that measure this single DOF. The motion in other DOFs are assumed to be negligibly small or—at least—highly reproducible so that they can be eliminated by calibration. This results in delicate, expensive joints.

An approach to increase the number of DOFs is to equip low-quality single-DOF joints with sensors that measure—in addition to the main DOF—all relevant parasitic DOFs, thereby facilitating the correction of the joint's deficiencies.

An example for a metrological device with encoders as known in the art is provided in FIGS. 1*a*, 1*b*. However, these instruments have several disadvantages as described in context of FIGS. 1*a*, 1*b*.

SUMMARY

The present disclosure provides a new optical encoder with several advantages compared to the ones known in the art. One object of the present disclosure is to provide an encoder enabling measurement of more than one rotational degree of freedom (DOF). This object is achieved as described herein.

The present disclosure relates to an opto-electronic encoder for a joint, preferably a joint of a metrological articulated arm or robot. The encoder comprises a reading head with at least a first measuring light source, e.g. a LED, and an image sensor, in particular a CMOS-sensor, for imaging reflected measuring light. The encoder further comprises an optical system with at least a ball lens and an aperture. The reading head and the ball lens are rotatable relative to each other in at least two degrees of freedom.

The ball lens comprises a front surface transparent for the measuring light and facing the reading head (and the light source) and an at least partially reflective, structured back surface. Further, the ball lens has—with respect to the measuring light—a (constant) refractive index of at least approximately two (two or nearly two) or a radially varying, in particular stepped or gradient, refractive index (which in sum equals to an index of about two). The refractive index is in any case such that a bundle of measuring light rays reflected inside the ball lens from a point of the back surface of the ball lens forms at least approximately a parallel bundle after getting refracted at the front surface of the ball lens.

Said rotational positions of the reading head and ball lens relative to each other are determinable with respect to the at least two degrees of freedom using an image of at least a section of the back surface, the image being captured with the image sensor through the optical system, by image evaluation of the imaged structure of the back surface.

Said concept provides amongst others the advantages of a measurement which is independent of the axial distance of reading head to ball lens as the measuring beam is collimated by the ball lens. In addition, a lateral offset between reading head and ball lens does not lead to an offset/translation of the image.

As a preferred option, the reading head comprises at least one marker pattern, imageable on the image sensor using measuring light for compensation of a change of translational position of the image sensor with respect to the optical system, using a position in an image of the marker pattern. Using such a reference marker, for example position changes of the image sensor caused by thermal influences can be compensated. The marker is for instance situated in the center of the optical systems' axis. As an alternative, the marker (or markers) is placed at the perimeter which has e.g. the advantage of less aberrations of the measurement image around the optical axis.

Optionally, the back surface is structured with respect to reflectivity and the measurement light is incoherent. Said otherwise, the back surface is structured regarding specular reflection, i.e. a pattern of reflective and absorbing parts or a distribution of regions, areas or dots with higher reflectivity amongst regions of lower reflectivity.

Alternatively, the light source and the structure of back surface are adapted to each other in such a way that a speckle image is formed on the image sensor when illuminating the back surface with measuring light, wherefore the coherence of the measuring light is adapted to the roughness of the back surface. Hence, the image of at least a section of the back surface is an image of speckles.

In preferred embodiments, the effective aperture is a virtual aperture at the center of the ball lens, formed by imaging a real aperture in one focus of a relay lens of the optical system. Thus, independent on the rotational position of the reading head and ball lens relative to each other, the chief ray of the light rays reflected from the point of the back surface—which are imaged on the image sensor—goes through the center of the ball lens.

As an option, the marker pattern is situated in an image plane of the optical system, which may include above mentioned relay lens, such that the marker is imaged onto the image sensor. Alternatively or additionally, the system comprises an additional lens which is part of the optical system and images the marker pattern and/or the marker pattern situated in the center of the relay lens onto the image sensor.

As another option in addition at least one translational degree of freedom of the ball lens and the reading head relative to each other is determinable. This is enabled by making use on the dispersive nature of the ball lens by evaluation of an image of the same part of the back surface produced with a different wavelength, wherefore the reading head comprises a second light source of second wavelength, different to the first wavelength of the first measuring light source, whereby preferably the two light sources can be turned on alternately.

Optionally, the encoder comprises a beam splitter, preferably a prism, arranged in such a way that emitted measuring light is splitable into two paths, enabling to image the back surface with different viewing angles.

The present disclosure also relates to a method for determination of the rotational position of a joint, in particular of a metrological articulated arm or robot, with respect to at least two, in particular all three, angular degrees of freedom, the joint having an opto-electronic encoder. In course of the method, there is emitting of measuring light at the ball lens, receiving measuring light reflected back from the back surface of the ball lens through the optical system, capturing reflected measuring light with the image sensor as an image and determining the rotational position with respect to the at least two, in particular all three, degrees of freedom by an image evaluation of the image.

Optionally, the encoder comprises a marker pattern as described above which together with the back side is imaged in one image and the image of the back side is evaluated in relation to the imaged marker pattern.

As another option, only regions of interest (ROI's) like sections of the imaged back surface, distributed in the image of the back surface, are evaluated for position determination. This option enables e.g. higher frame rates or measurement rates compared to an evaluation of the complete image. The regions of interest are optionally distributed equally about the image and/or have a rectangular shape. As another option, each region of interest comprises a marker pattern.

As still another option, the emitting of measuring light source and the capturing of reflected measuring light are synchronized with respect to each other.

The inventive encoder preferably enables self-calibration or provides a self-calibration functionality. As for calibration purposes e.g. a high frame rate is not of high priority, for self-calibration preferably the complete image is evaluated or the encoder is self-calibrated by evaluation of an image of the back surface as a whole-even if in measurement mode only ROIs are evaluated as said above.

BRIEF DESCRIPTION OF THE DRAWINGS

The encoder and the method according will be described in greater detail hereinafter, purely by way of example, with reference to exemplary embodiments depicted schematically in the drawings.

More specifically, in the drawing

FIG. 7 shows another example of a measurement image, and FIG. 8 depicts in a simplified schematic illustration a further development of the image based multiple DOF encoder.

DETAILED DESCRIPTION

Figure 1A:
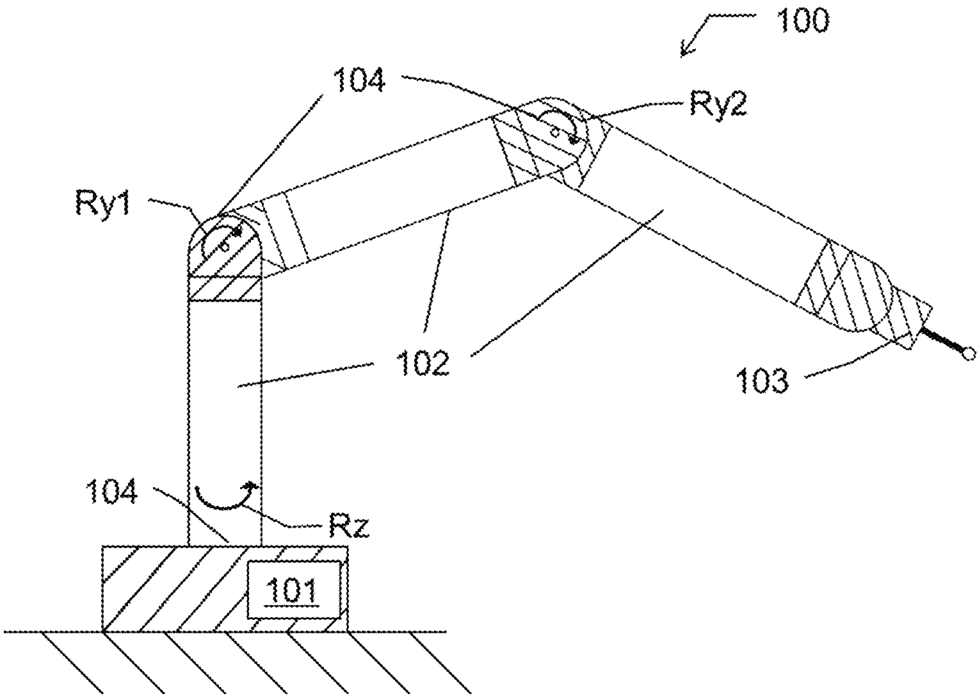
FIGS. 1*a,b* schematically show a metrological instrument embodied as an articulated arm of the prior art, FIG. 2 schematically shows a joint with an opto-electronic encoder comprising a ball lens as scale.
Figure 1B:
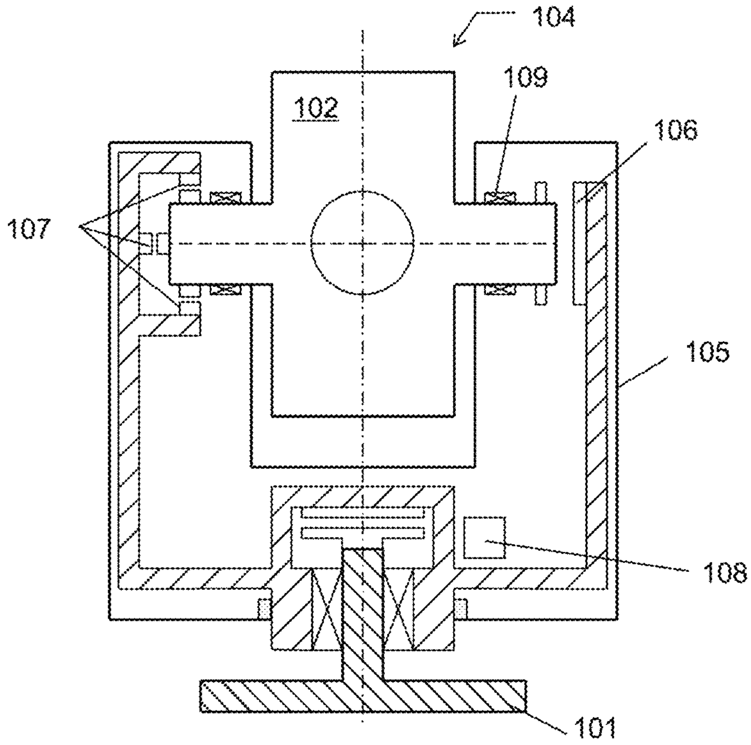

FIGS. 1*a* and 1*b* show a metrological instrument embodied as an articulated arm 100 as known in the art. The arm 100 comprises a plurality of segments 102, connected to a base 101 and to each other by respective joints 104. The joints 104 enable a rotation about (only) one axis as indicated in FIG. 1*a* by the arrows Rz, Ry1, Ry2. With such a measurement arm 100, dimensions of a workpiece or the like can be measured by touching it with the arm's probe head 103 and determining the position of the probe head 103 by reading the respective rotational position Rz, Ry1 or Ry2 of each single-axis joints 104 and combining these positions together with the known lengths of the segments 102, using an angle encoder 106 within a respective joint 104 as depicted in FIG. 1*b*, showing a cross section of a joint 104, with the end part of a segment 102 connected within a frame structure 105 to the base 101 (or another segment), supported by bearings 109.

In arms 100 with improved measurement precision, in addition to encoders 106 for determination of the rotation about the intended rotation axis Rz, Ry1 or Ry2, the joint 104 comprises additional positions sensors like distance sensors 107 or tilt sensor 108 for determining unintended movements of the joint 104. That is, such single-degree of freedom-(DOF) joints 104 may be equipped with sensors 107, 108 that measure—in addition to measurement of the main DOF by angle encoder 106—all relevant parasitic DOFs, thereby facilitating the correction of the joint's deficiencies.

Such metrological devices—or similar robot arms—as known in the art thus have the disadvantage of using joints 104 which provide only one DOF each, wherefore a couple of joints 104 (and segments 102) are needed to enable more than one DOF for the probe head 102. In addition, to reduce or determine measurement errors caused by structural deficiencies of the joints 104, additional effort is needed, e.g. by implementation of additional sensors 107, 108 as shown.

Figure 2:
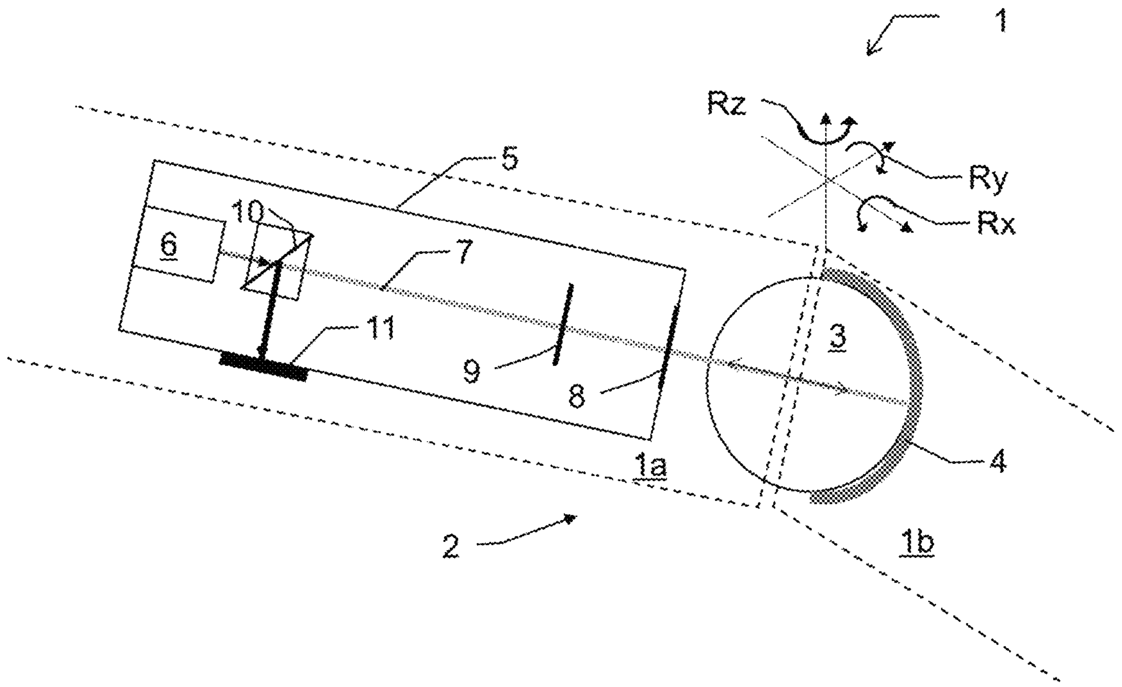

FIG. 2 shows a joint 1 with an opto-electronic encoder 2. In contrast to prior art 1-DOF or single axis joints as shown in FIGS. 1*a,b*, the joint 1 is a multi-axis joint, enabling at least 2-DOF or as depicted all three rotational DOFs: rotation Rz about the z-axis, Ry about the y-axis and Rx about the x-axis. That is, the two connected parts 1*a* and 1*b* of joint 1 (or two arm segments 102, see FIG. 1*a*) can be rotated about all axes.

In order to measure the respective rotational positions Rz, Ry, Rx, the encoder 2 is provided. The encoder 2 comprises a measurement or reading head 5 in the first part 1*a* of the joint 1 and a 3D-measurement scale in form of a ball lens 3 in the joint's counterpart 1*b*. Hence, the reading head 5 and the ball lens 3 are rotatable with respect to each other and are rotating to each other when the joint 1 is rotated. The rotational position or rotation angles are measured using an image of the lens' back surface 4 (that is the surface not directly opposing/not facing the reading head or said otherwise the farther surface/side/hemisphere of the ball 3 seen from the reading head).

The image is generated using a measurement light beam 7 from a light source 6 of the read head 5, directed at the front surface of the ball lens 3 (the surface facing the reading head 5). The front surface as well as the ball lens 3 is transparent for the measurement light 7, whereas the back surface 4 is at least partly reflective wherefore at least part of the measurement light 7 is reflected back, re-entering the reading head 5 through aperture 8 and directed to an image sensor 11, e.g. a CMOS or CCD-sensor by beam splitter 10. Preferably, the image acquisition of the image sensor 11 and the light emission of the light source 6 are synchronized.

Hence, at least part of the back surface 4 of the sphere 3 is imaged by an optics comprising at least aperture 8 and ball lens 3 onto the image sensor 11. In other words, one of the hemispheres of the ball 3 is transparent, the other hemisphere is reflective and e.g. sandblasted and/or coated. The transparent side acts as a lens of the imaging system.

To compensate for a drift of the image sensor 11, e.g. caused by thermal influences (heat), the optical system comprises a marker or marker pattern 9 in the optical path. Said otherwise, there is a correction for (e.g. thermally induced) translation, rotation and/or deformation of the image sensor 11 by a marker 9 imaged to the sensor 11 that defines the zero point. The goal of this marker 9 is to have an image of a pattern for compensation of mechanical instabilities, and thermal expansion of the reading head 5. The marker 9 is for example a plate with a reflective lithographic pattern with an absorbing layer at the back-side. The optical system may comprise an additional lens for imaging the marker 9, e.g. having about the same size as the marker 9 and being situated directly in front of it.

The back surface 4 of ball lens 3 is structured in such a way that the image is depending on the orientation of the ball lens 3 relative to the reading head 5 or the rotational position Rz, Rx and Ry of the joint 1. Thus, by image evaluation of the image, the orientation or rotational position is determined. The ball lens 3 preferably has a refraction index n (for the wavelength of the measurement light 7) very close to 2 (±1%), e.g. 2.002 or 1.985, as explained in more detail with respect to FIG. 3.

Figure 3:
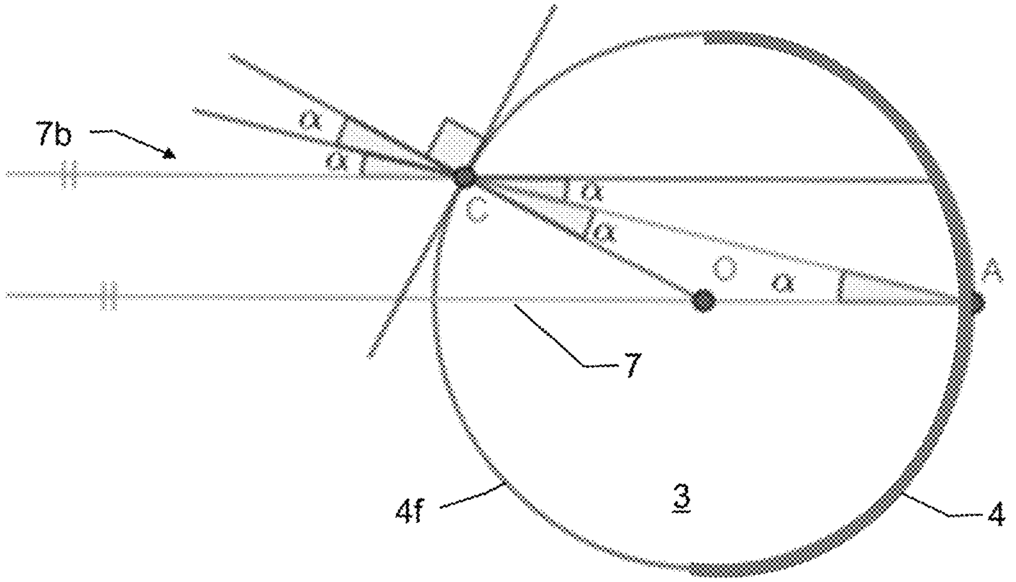
FIG. 3 depicts a ball lens and measurement beam.

FIG. 3 shows schematically a ball lens 3 with the measurement beam 7. The ball lens 3 is made of a material with refraction index $n \approx 2$ for the chosen wavelength of beam 7. The beam 7 is reflected or scattered back at structured back side 4 of the ball lens 3. According to geometric principles, Snell's law and the small angle approximation $\sin(\alpha) \approx \alpha$ and similarly $\sin(2\alpha) \approx 2\alpha$, one can see that rays emanating from a point A on the back side 4 of the ball lens 3 will build a parallel bundle 7*b* after getting refracted at the front side 4*f* of the ball lens.

Since the index of refraction of the ball material is close to n=2, the rays that are retro-diffused by one scatter point A of the back side 4 are almost perfectly collimated at the output of the ball 3. This allows to substantially relax the requirements on the ball position tolerance with respect to the reading head 5.

In the paraxial approximation and for n=2 the system is sensitive to rotation/orientation only and not to translation.

An alternative to a homogeneous ball lens 3 as shown is a ball lens with a refractive index which is in effect (nearly) equal to two but is varying in direction of the sphere's center (rotationally symmetric), for instance a stepped or gradient radially varying index with the same refractive effect as a ball lens 3 with an invariant index of about two. An example is a so called Luneburg lens.

Figure 4:
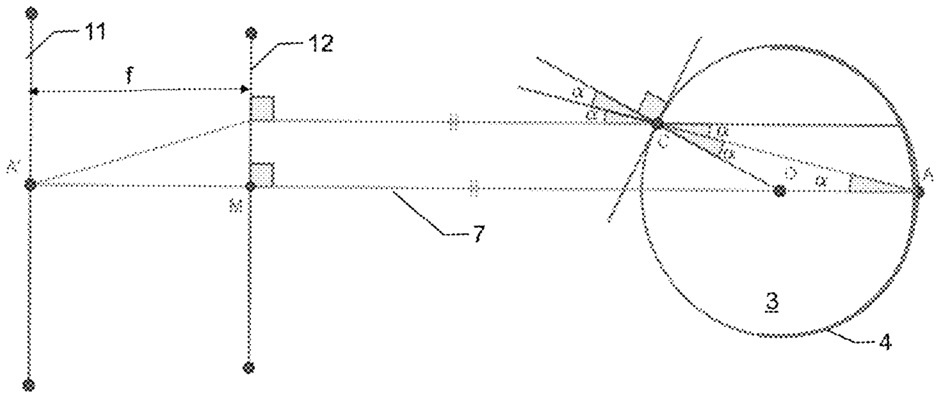
FIG. 4 shows a simplified optical system with ball lens, image sensor, a further lens and an optical measurement path, FIGS. 5*a,b* illustrate another example of a simplified optical system, FIGS. 6*a,b* show two examples of an image generated by the image sensor of an encoder.

FIG. 4 shows a simplified optical system with the ball lens 3 and the image sensor 11 for imaging measuring light 7, reflected by the back surface 4 of lens 3. The system comprises a (thin) lens 12 whose focal length f is equal to the distance to the image sensor 11 and a ball lens 3 with refraction index n=2. Some rays 7 emanate from a point A of the back side 4 of the ball lens 3 and after getting refracted by the front side of the ball lens 3, the rays 7 get parallel. The thin lens 12 then focuses the parallel bundle to a point A' on the image sensor 11. Hence the point A gets mapped to the point A'. This can be done for any other point on the back 4 of the ball lens 3, i.e. one gets an imaging map from the back surface 4 of the ball lens 3 to the image sensor 11.

The encoder may comprise stored decoding information in form of an imaging map or feature descriptors or the like of the back surface 4 to the image sensor 11. The decoding information or map could be an intensity image of the pattern/speckles, a stereographic projection or a coordinate list of identifiable features like speckle centers.

The magnification is given by the ratio of the focal length f of the thin lens 12 to the radius of the ball lens 3, for instance 30 mm: 5 mm=6. It is passive except for the image sensor 11.

The optical system may further comprise a prism (not shown), preferably as an exit optical element of the reading head. With such a beam splitter, arranged in such a way that emitted measuring light 7 is split into two optical paths, the back surface 4 is imaged with different viewing angles. That is, the measuring light 7 can be divided into two paths to generate multiple field-of-views on the image sensor (see FIG. 6*b*, too). The viewing angles are for example+/−30° (with respect to the optical axis).

Figure 5A:
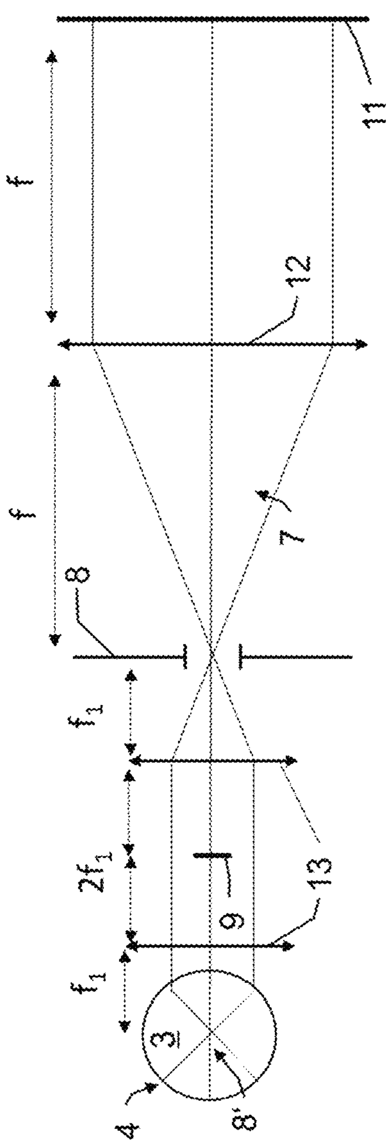
Figure 5B:
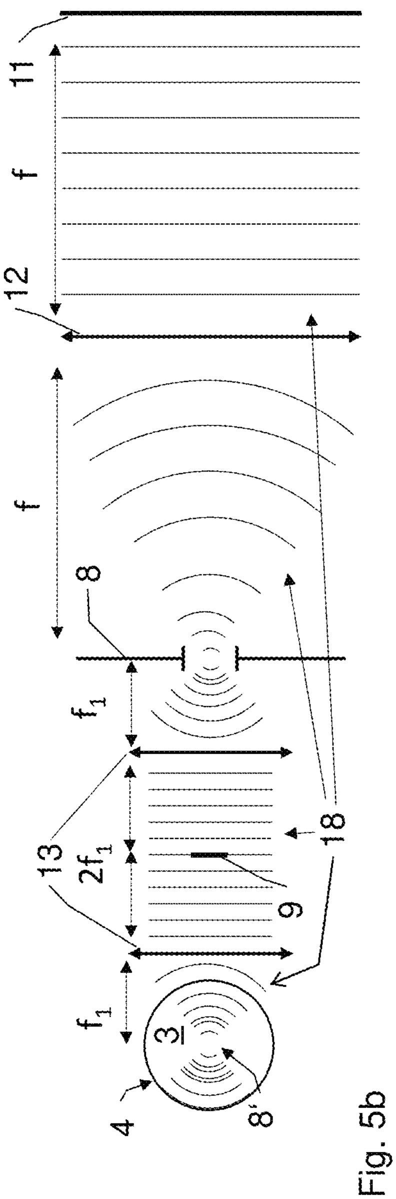

FIGS. 5*a,b* show another example of a simplified optical system, whereby FIG. 5*a* depicts the system with the chief rays depicted and FIG. 5*b* the system with the wavefronts depicted. The system comprises the ball lens 3 and the image sensor 11 by which measuring light 7, reflected by the back surface 4 of lens 3 and passing through aperture 8 and lens 12 with focal length f is imaged. The optical system in this example further comprises a relay optics or lens 13—preferably as (part of) front optics of the reading head-, embodied as two lenses with focal length f1 with a distance of two times the focal length f1 in between. As also shown, a marker pattern 9 as already described above is in the image-plane that is formed inside the relay lens 13.

The relay lens 13 is situated between aperture 8 and ball lens 3. The distance between aperture 8 and lens 13 equals the focal length f1 of a lens 13. This way, a virtual aperture 8' (or entrance pupil) is formed by imaging the aperture 8 into the ball lens 3. Hence, relay lens 13 maps the aperture 8 onto the sphere 3. Because of the imaging of the real aperture 8 "seen" from the object space, the "virtual" aperture 8' or entrance pupil is at the center of the ball lens 3. Therefore, the design is hypercentric/pericentric at the ball lens 3 (a lens system where the entrance pupil is located in front of the lens, in the space where an object is or could be located; the optical system is telecentric at the image sensor 11).

Due to this arrangement, a virtual aperture 8' situated with its center at the center of the ball lens 3 is present. The goal of relay lens 13 is to make an image of the aperture 8 at the center of the ball 3, so that the chief ray (by definition the ray crossing the center of an aperture) of each field point is nearly perpendicular to the spherical surface as shown in FIG. 5*a*.

Said otherwise, the same set of rays 7 is used at a given point of the sphere 3 independent of the sphere's orientation. This is achieved by forming synthetic aperture 8' at the center of the sphere 3 by imaging the physical aperture 8 via a relay lens 13. Or, as shown in FIG. 5*b*, depicting the wavefront 18 (the set of points which see the same optical paths), from the spherical object surface to image plane 11, all points have travelled the same optical paths, since the curvature of the wavefront 18 matches the spherical surface in the object plane, since the plane wavefront 18 is parallel to the image surface in the image plane. This allows for a high precision of the encoder.

FIG. 6*a* shows an example of an image 14 generated by the image sensor 11 of an encoder 2, for example as depicted in FIG. 2. In the image's center, there is an image of the marker pattern 9. It is surrounded by an image of the ball lens' back surface 4*i*.

In the example, the back surface image is a speckle image 4*i*. In order to generate such a speckle image 4*i*, the back surface 4 is a rough surface, preferably with a reflective coating, and the measurement light 7 is coherent, preferably of low coherence (a minimal temporal coherence), such that interference effects are reduced (particularly parasitic effects are avoided) but still speckles form. The rough surface may be formed e.g. by sandblasting, silver coating and/or ALD coating. The aperture 8 defines speckle size or resolution of the imaging optics. In fact, the coherence of the measuring light 7 is adapted to the roughness of the back surface 4.

As an alternative or addition to a speckle image, image formation is by specular reflection, i.e. a pattern of reflective and absorbing parts of the sphere's back surface 4. In this case, the encoder 2 comprises an incoherent measurement light source. The back surface 4 can for example be a lithographically defined structured reflective coating, e.g. covered with black paint or chrome, and/or showing a ring or dot pattern, e.g. with a specific distribution for unambiguousness.

The speckle image 4*i* is measured relative to the image 9*i* of the marker, the latter being independent of the ball lens 3. This makes the measurement for example independent of image sensor translations. For instance, if the image sensor's position is unstable, there will be not only a translation of the speckle pattern 4*i*, but also a translation of the marker image 9*i*. Without the marker, the translation of the speckle pattern would be wrongly interpreted as a rotation of the ball 3. Thus, the marker 9 allows for instance for correcting for e.g. thermally induced deformation (change of shape) or lateral translation and rotation about the optical axis/rotation in the lateral plane of the image sensor by a marker pattern 9 imaged to the sensor 11 that defines the zero point and orientation.

FIG. 6*b* shows another example of a measurement image 14. Such an image, in the example a speckle image, is obtained by an encoder comprising a prism as part of the imaging optics as described above in context of FIG. 4. Hence, there are multiple optical paths for the measurement light and hence multiple images 4*i* of the back surface as explained above. With an embodiment comprising a prism, e.g., two images with a wide base-line b for high angular precision about the optical axis can be created.

The middle of image 14 comprises an image of a marker pattern as reference as explained above. Thereby, the marker pattern may be integrated in the prism itself or may be a separate element in the beam path, e.g. embodied as a marker plate with an adjacent lens in between prism and image sensor.

FIG. 7 shows another example of a measurement image 14. In the example, four regions of interest ROI are depicted. Instead of reading out the complete image 14, only these regions-of-interest ROI of the image are evaluated to increase measurement rate, e.g. in the range of several hundred Hz or up to kHz. In addition, data compression can be implemented in the sensor by feature detection.

However, in preferred embodiments of the encoder 2 with self-calibration functionality, the complete image 14 is evaluated when executing the self-calibration. In other words, when measuring and demanding a high frame rate, only ROIs are evaluated, when calibrating and demanding minimizing of errors, the complete image 14 or at least a bigger frame is evaluated.

Such a self-calibration may comprise use of at least one reference angle encoder (single DoF). Better calibration precision can be achieved with such reference values in at least one DoF.

In any case, a marker pattern 9*i* and the back side 4*i* are imaged in one image 14 and the image of the back side is evaluated in relation to the imaged marker pattern 9*i*. In the example, each region of interest comprises a marker pattern 9*i*. That is, the image 14 comprises multiple small markers 9*i* instead of the single big marker shown in FIG. 6. With this alternative concept, using four markers in corner of the admissible field of view, a rotational accuracy e.g. <1 arcsec, can be provided while decreasing the total area of the marker 9. As the marker 9 does not move much if at all, larger aberrations can be tolerated. The markers could be made out of a diagonal strips pattern. As shown, for example four ROIs are used wherein each ROI contains one of the markers 9*i* and a rectangular area of speckles 4*i*.

FIG. 8 depicts a further development of the image based multiple DOF encoder. For better clarity, only the reading head 5 and the ball lens 3 are shown. In this embodiment, two different measurement wavelengths are used. For instance, for the illumination, the light emitted by two different LEDs is used, the first one emitting at 595 nm (orange), and the second one emitting at 730 nm (infrared). Since the index of refraction of the ball lens 3 is not exactly two for the used wavelengths, the system is sensitive to a translation of the ball lens 3 with respect to the reading head 5 or of a translation of the two joint elements (if n=2 is fulfilled perfectly, the system is sensitive to orientation only, not translation).

For each wavelength, a virtual image 15 or 16 of the back side of the ball lens 3 is generated by the optical system. In the case of exactly n=2, these virtual objects would have infinite size, i.e. looking into the ball 3 would be like looking at the stars in the sky regarding the behavior of the image to rotation and translation. For n<2, the virtual object 16 lies on the side of the ball lens 3, for n>2, the virtual object 15 lies on the other side of the ball lens 3. For the two wavelengths chosen, the two virtual objects 15, 16 for 595 nm resp. 730 nm lie on opposite sides of the ball lens 3.

Hence, it can be said that two large virtual spherical surfaces 15, 16 on opposite sides of the ball lens 3 are imaged (for n<2, there is a virtual image, for n>2 a real image). The reading head 5 is measuring a small subpart to both sides. The optical axis 17 is the connection to the physical position corresponding to the center of the two images. Hence, the relative pose (rotation and translation) of the reading head 5 and ball lens 3 can be determined for 5 DOFs, except for a translation along the optical axis 17. This last DOF can be determined from the magnifications of the two wavelengths.

Thus, making use on the dispersive nature of the ball lens 3 by evaluation of an image of the same part of the back surface produced with a different wavelength, additional DOFs can be measured in order to determine one or more translational positions in addition to rotational positions, too. That is, there is provided a measuring using two wavelengths with at least one chosen so that n slightly deviates from 2. A translation can be determined from the subtle differences between image transformations at the two wavelengths. With the exemplified embodiment, the reading head 5 makes two images of the ball lens 3 using at least two different LEDs. With the two images and e.g. prestored reference images and calibration parameters it can determine the pose (6DOF) of the ball 3 relative to the reading head 5.

Preferably, the beams of the two wavelengths are combined and the image acquisitions are alternating at the two wavelengths. The different light sources can be turned on alternately to separate the images temporally.

Preferably, the encoder measures two or three angles with large actuation range (e.g.)+45°, and a displacement vector (either only the two lateral components or all three components, including on-axis) with small actuation range (the joint allows for relatively large rotations but compared thereto only small translations). Of course, the encoder can comprise additional, conventional position sensors for measuring of one or more DOFs, e.g. the encoder may be complemented with an additional 1-DOF sensor that measures rotation about the optical axis.

The possibility of determining also one or more translational positions is in particular advantageous for determining small, unintended translational changes in a joint, e.g. generated by stress or heavy loads. The use of two colors of measurement light allows to distinguish translation and rotation so that the requirement on the mechanical tolerances are relaxed, e.g to a mechanical play of about 50 micrometers.

When translating the ball 3, a translation of the image is not the only effect visible in the image. The local radius of curvature, ball type (diffusive vs. reflective) and the aperture size affect the translation sensitivity. The changes are respectively the same for both wavelengths.

It goes without saying that these shown figures schematically show merely possible exemplary embodiments. The various approaches can also be combined with one another in accordance with the disclosure and combined with corresponding devices and methods of the prior art if not mentioned otherwise.

The invention claimed is:

1. An opto-electronic encoder for a joint, the encoder having:
- a reading head comprising
  - at least a first measuring light source, and
  - an image sensor for imaging reflected measuring light,
- an optical system comprising at least a ball lens and an aperture, whereby the ball lens comprises
- a front surface transparent for the measuring light and facing the reading head and
- an at least partially reflective, structured back surface,
- the ball lens has, with respect to the measuring light, a refractive index (n) of at least approximately two or a radially varying refractive index (n), such that a bundle of measuring light rays reflected inside the ball lens from a point (A) of the back surface of the ball lens forms at least approximately a parallel bundle after getting refracted at the front surface of the ball lens,
- the reading head and the ball lens are rotatable relative to each other in at least two degrees of freedom,
- such rotational positions of the reading head and ball lens relative to each other are determinable with respect to the at least two degrees of freedom (Rx, Ry, Rz) using an image of at least a section of the back surface, captured with the image sensor through the optical system, by image evaluation of the imaged structure of the back surface.

2. The encoder according to claim 1, wherein the reading head comprises at least one marker pattern, imageable on the image sensor using measuring light for compensation of a change of shape or pose of the image sensor with respect to the optical system, using a position in an image of the marker pattern.

3. The encoder according to claim 2, wherein the marker pattern is situated in an image plane of the optical system such that it is imaged onto the image sensor.

4. The encoder according to claim 1, wherein the back surface is structured with respect to reflectivity and the measurement light is incoherent.

5. The encoder according to claim 1, wherein the first measuring light source and the structure of back surface are adapted to each other in such a way that a speckle image is formed on the image sensor when illuminating the back surface with measuring light, wherefore the coherence of the measuring light is adapted to the roughness of the back surface.

6. The encoder according to claim 1, wherein the aperture is situated in the reading head.

7. The encoder according to claim 1, wherein the aperture is a virtual aperture at the center of the ball lens, formed by imaging a real aperture in one focus of a relay lens of the optical system.

8. The encoder according to claim 1, wherein in addition at least one translational position of the ball lens and the reading head relative to each other with respect to at least one degree of freedom is determinable
- making use of the dispersive nature of a glass of the ball lens by evaluation of an image of the same part of the back surface produced with a different wavelength, wherefore the reading head comprises a second light source of second wavelength, different to the first wavelength of the first measuring light source, or
- by evaluation of intensity or decorrelation of the image.

9. The encoder according to claim 8, wherein for separate image generation, the first measuring light source and the second light source are activated alternately.

10. The encoder according to claim 1, wherein the encoder comprises a beam splitter arranged in such a way that emitted measuring light is splitable into two paths, enabling to image the back surface with different viewing angles.

11. The encoder according to claim 1, wherein the encoder has a self-calibration functionality.

12. The encoder according to claim 1, wherein the image sensor is embodied as a CMOS sensor.

13. The encoder according to claim 1, wherein the radially varying refractive index (n) is a stepped or gradient refractive index.

14. A method for determination of the rotational position of a joint with respect to at least two rotational degrees of freedom (Rx, Ry, Rz) with an opto-electronic encoder of the joint,
- the opto-electronic encoder having
  - a reading head comprising
    - at least a first measuring light source, and
    - an image sensor—for imaging reflected measuring light,
  - an optical system comprising at least a ball lens and an aperture, whereby the ball lens comprises
- a front surface transparent for the measuring light and facing the reading head and
- an at least partially reflective, structured back surface,
- the ball lens has, with respect to the measuring light, a refractive index (n) of at least approximately two or a radially varying-refractive index (n), such that a bundle of measuring light rays reflected inside the ball lens from a point (A) of the back surface of the ball lens forms at least approximately a parallel bundle after getting refracted at the front surface of the ball lens,
- the reading head and the ball lens are rotatable relative to each other in at least two degrees of freedom, the method performed with the opto-electronic encoder comprising:
- emitting measuring light at the ball lens,
- receiving measuring light reflected back from the back surface of the ball lens through the optical system,
- capturing reflected measuring light with the image sensor as an image of at least a section of the back surface,
- determining the rotational position with respect to the at least two degrees of freedom (Rx, Ry, Rz) by an image evaluation of the image.

15. The method according to claim 14 wherein a marker pattern and the back surface are imaged in one image and the image of the back side is evaluated in relation to the imaged marker pattern.

16. The method according to claim 15, wherein only one or more regions of interest (ROI) as sections of the imaged back surface, distributed in the image of the back surface, are evaluated for position determination.

17. The method according to claim 16, further comprising synchronized emitting measuring light and capturing reflected measuring light with the image sensor.

18. The method according to claim 15, further comprising synchronized emitting measuring light and capturing reflected measuring light with the image sensor.

19. The method according to claim 14, wherein only one or more regions of interest (ROI) as sections of the imaged back surface, distributed in the image of the back surface, are evaluated for position determination.

20. The method according to claim 19, further comprising synchronized emitting measuring light and capturing reflected measuring light with the image sensor.

* * * * *